Figure 1:
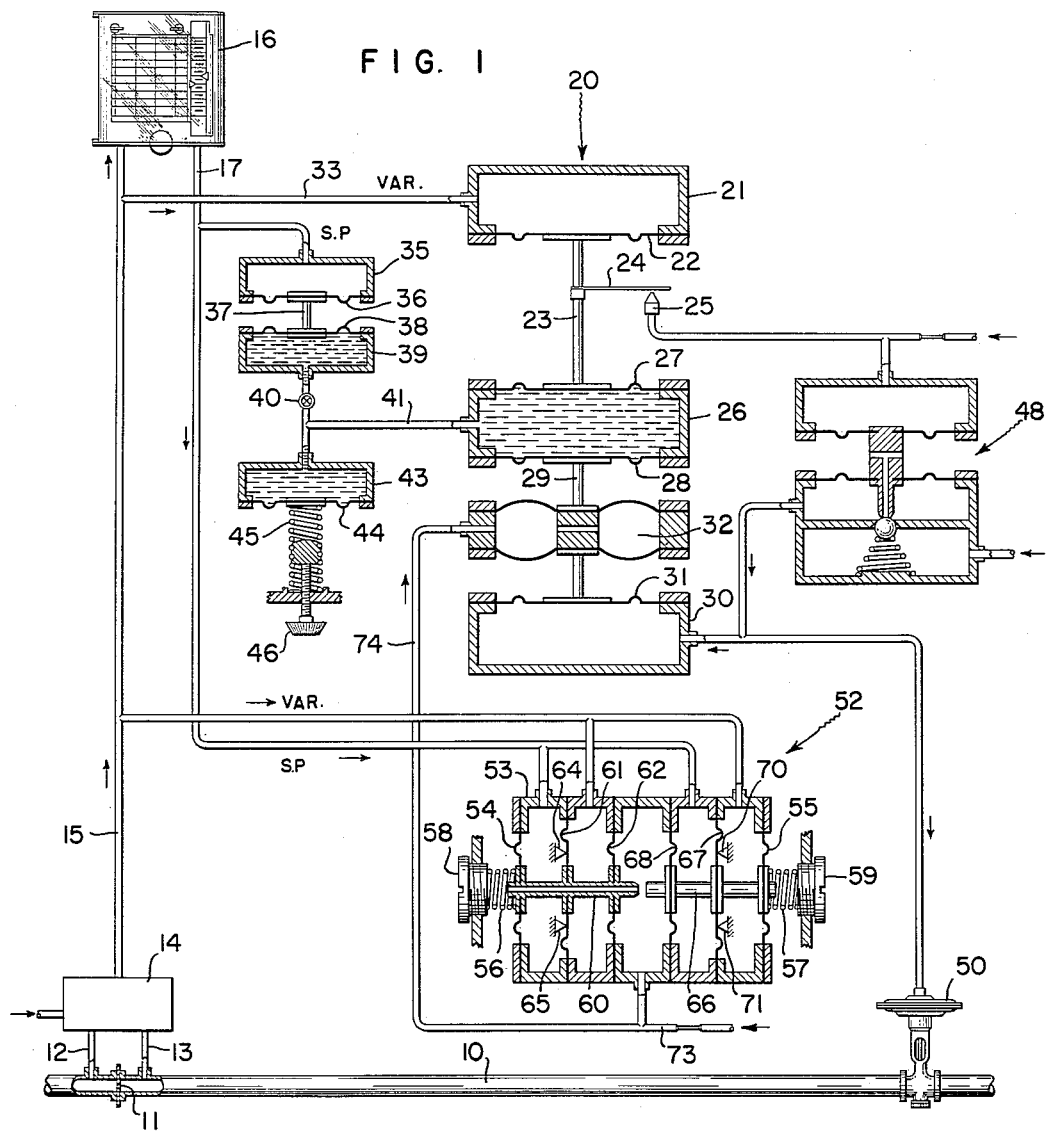

May 15, 1956   E. C. GROGAN   2,745,423
SELF-ADJUSTING CONTROL APPARATUS
Filed Oct. 8, 1954

INVENTOR.
EDWARD C. GROGAN
BY
ATTORNEY.

United States Patent Office 2,745,423
Patented May 15, 1956

2,745,423

SELF-ADJUSTING CONTROL APPARATUS

Edward C. Grogan, Philadelphia, Pa., assignor to Minneapolis-Honeywell Regulator Company, Minneapolis, Minn., a corporation of Delaware Application October 8, 1954, Serial No. 461,132

16 Claims. (Cl. 137—85)

A general object of the present invention is to provide a new and improved self-adjusting controller for use in regulating the magnitude of a controlled variable. More specifically, the invention is concerned with a self-adjusting controller of the type having a fluid pressure input and a balancing fluid pressure cooperating to regulate the adjustment of a flapper-nozzle unit wherein the controller includes means for varying the controlling action thereof in accordance with a predetermined deviation of a signal indicative of the magnitude of a variable with respect to a predetermined set point signal.

The preferred form of the present invention illustrated and described employs a pneumatic controller of the pressure input and pressure force balance feedback type which incorporates both proportional band and reset adjustments. The proportional band adjustment of a controller of the present type is used to vary the ratio of output control signal with respect to input control signal. The proportional band adjustment is sometimes referred to as a gain adjustment. With a narrow proportional band, the output control signal from the controller is relatively large when compared to the input signal. When the proportional band of the control is widened, the output control signal is smaller for a corresponding input signal change. The resetting function of the present controller is used to designate that feature wherein the feedback action of the controller is slowly eliminated so that if the magnitude of the variable to be controlled does not coincide with the desired magnitude as determined by the adjustment of the set point of the controller, an adjustment of the controller output will be made to eliminate the deviation.

In controllers of the present type, it has been found that if there is a tendency for the controller to continuously maintain a deviation from the desired set point, the controlling action of the controller may be improved by increasing the gain or narrowing the proportional band of the controller and also by increasing the rate at which the reset action of the controller will take place.

It is thus an object of the present invention to provide means which will readily effect an automatic adjustment of the proportional band and reset functions of a controller of the present type so as to eliminate undesirable deviations in the controlling action of the controller.

It is accordingly a more specific object of the present invention to provide a new and improved self-adjusting controller of the stack type which will automatically sense the presence of a predetermined deviation in the measured variable and adjust the controller in a manner to more rapidly eliminate the deviation in the measured variable.

Another more specific object of the present invention is to provide an improved self-adjusting controller incorporating a fluid spring as a means for varying the pressure feedback forces produced within the controller so as to vary the proportional band and reset actions of the controller.

Still another more specific object of the present invention is to provide a self-adjusting controller of the type having a variable pressure source, a set point pressure source, and a feedback pressure source acting on a plurality of diaphragms to effect a predetermined controlling action of a flapper-nozzle unit with the self-adjustment of the controller parameters being achieved by a fluid spring supplied by a pressure source which derives its pressure from a signal source indicative of a predetermined deviation in the measured variable from the set point signal.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 2:
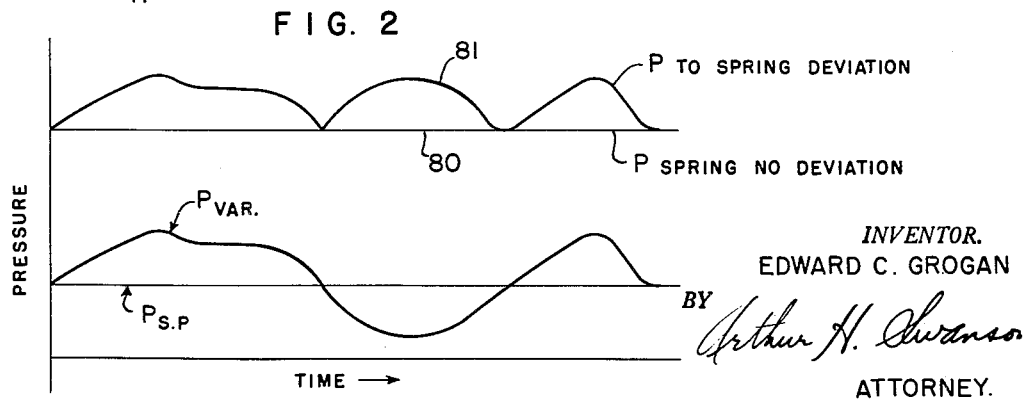

Of the drawings:

Fig. 1 represents a diagrammatic showing of a preferred embodiment of the invention; and Fig. 2 shows a graphical representation of pressure wave signals related to the apparatus shown in Fig. 1.

Referring first to Fig. 1, the numeral 10 represents a conduit through which is flowing a fluid where the rate of flow of the fluid is to be controlled by the apparatus of the present invention. Positioned in the flow line 10 is an orifice plate 11. Connected in the pipe 10 on either side of the orifice plate 11 are a pair of differential pressure transmitting conduits 12 and 13 which are used to supply differential pressure to a differential pressure transmitter 14. The differential converter 14 may well be of the type disclosed in the copending application of John Booth et al., Serial No. 248,358, filed September 26, 1951. This differential converter is of the type which will produce an output control pressure in output conduit 15 which is proportional to the rate of flow of fluid through the pipe 10.

The pressure in the conduit 15 leads to a suitable indicator and recorder 16. The indicator and recorder 16 may also be used to provide a set point signal source of pressure in a conduit 17. The stack type of pneumatic controller is shown at 20 and this comprises a first pressure chamber 21 having a diaphragm 22 enclosing one side thereof. Attached to the diaphragm 22 is a flapper-nozzle actuator 23 which connects to a flapper 24, the latter of which is adjusted relative to a nozzle 25. The controller 20 also includes a second chamber 26 which is enclosed on its upper surface by a diaphragm 27 having the flapper actuator 23 connected thereto. The lower portion of the chamber 26 is enclosed by a diaphragm 28. The lower diaphragm is in turn connected by a rigid connection 29 to a diaphragm 31 which encloses a chamber 30. Interposed on the connector 29 between the diaphragms 28 and 31 is a fluid spring 32, said spring having an adjustable gradient which is adjustable in accordance with the magnitude of a pressure applied to the internal surface of the spring. The fluid spring 32 comprises two concentrically disposed resilient diaphragms rigidly connected at their centers and at their peripheral edges to form a closed chamber space. The spring gradient of spring 32 exists between the diaphragm centers and their peripheral edges, the latter of which are rigidly supported. The extent to which the central portion may be deflected for a given input force with respect to the stationary peripheral edges, or the gradient of the spring, is varied as the pressure in the chamber space formed by the diaphragms is varied. This adjustable gradient spring is disclosed and claimed in the copending application of Robert Ochs et al., Serial No. 461,084, filed October 8, 1954.

The pressure signal supplied to the chamber 21 is derived from the differential pressure converter 14 by way of conduit 15 and a further conduit 33. The pressure signal supplied to the chamber 26 is derived from the set point source of the indicator and recorder 16 and passes by way of a conduit 17 to a chamber 35, having a diaphragm 36 on the lower edge thereof, a connection 37 to a further diaphragm 38 on a chamber 39, a restriction 40, and a conduit 41 to the chamber 26. Also connected to the conduit 41 is capacity chamber 43 which is formed by a diaphragm 44 biased by a suitable spring 45.

The pressure signal for the chamber 30 is derived from the nozzle pressure 25 after it has been passed through a conventional type of pneumatic relay 48. The output pressure from the pneumatic relay is also fed to a suitable control valve 50 which is positioned in the fluid flow line 10 so as to regulate the flow of fluid therethrough.

For sensing the deviations of the measured variable from the set point signal, there is provided a deviation sensing means 52. This sensing means comprises a chamber 53 which is enclosed at its ends by a pair of diaphragms 54 and 55, the latter of which are spring biased by springs 56 and 57. The bias from these springs is adjustable by suitable threaded members 58 and 59 respectively. Carried by the diaphragm 54 is an exhausting port 60 which projects inwardly into the center of the chamber 53. This exhausting port 60 is also supported by a further pair of diaphragms 61 and 62 which define further enclosures within the chamber 53. A pair of mechanical stops 64 and 65 are associated with the diaphragm 61. Carried by the other enclosing diaphragm 55 is a throttling member 66. This member is also carried by a pair of further diaphragms 67 and 68, the latter of which form two further enclosures within the chamber 53. A pair of mechanical stops 70 and 71 are associated with the diaphragm 67. Pressure is supplied to the chamber 53 by way of an inlet conduit 73 which has a conventional restriction therein and the outlet pressure of the chamber 53 is fed by way of a conduit 74 to the fluid spring 32.

In considering the operation of Fig. 1, it is first assumed that the apparatus is in a balanced state and that the variable pressure applied to the chamber 21 is equal in magnitude to the set point chamber pressure in chamber 26. When the pressures exerted upon the diaphragms 22 and 27 of the chambers 21 and 26 respectively are balanced, the flapper 24 will assume a predetermined position with respect to the nozzle 25 so that the nozzle back pressure will be of a predetermined magnitude for maintaining the valve 50 in a fixed position. As long as there are no deviations, the apparatus will continue to operate with only the diaphragms 22 and 27 regulating the final output pressure to the valve 50.

Should the pressure signal in conduit 15 from the differential converter 14 increase in magnitude, there will be an increased pressure in the variable chamber 21. This increased pressure will deflect the diaphragm 22 in a downward direction and carry with it the flapper actuator 23 and flapper 24 and move the flapper 24 against the nozzle 25. There will be a resultant increase nozzle back pressure which will be applied through the relay 48 to the valve 50. The increased pressure will also be applied from the output of the relay to the balancing chamber 30. The chamber 30 upon having an increased pressure applied thereto will cause the diaphragm 31 thereof to be deflected in an upward direction. As the diaphragm 31 deflects upward, it will deflect the rod 29 and therefore the diaphragm 28 on the chamber 26. When the diaphragm 28 is moved in the chamber 26, it will cause a force to be produced upon the diaphragm 27 that will tend to move the flapper actuator 23 in a balancing direction away from the nozzle 24. Since the chamber 26 is liquid filled, the pressure transfer from the diaphragm 28 to that of 27 will be substantially immediately and in full force. However, the liquid in the chamber 26 will tend to flow into the capacity chamber 43 and into the chamber 39. The chamber 39, however, is limited in its effect to dissipate the follow-up action in that the restriction 40 is in the flow line feeding the chamber 39. This will mean that substantially full effect will be felt immediately upon the diaphragm 27 when the diaphragm 28 is deflected or has a force applied thereto by the diaphragm 31.

The force acting upon the rod 23 tends to move the flapper 24 away from the nozzle 25 and decrease the nozzle back pressure going to the valve 50. The valve 50 will accordingly stabilize out at a slightly different magnitude of opening. As soon as the adjustment of the valve 50 has been felt in the line, the magnitude of the pressure from the differential converter 14 will decrease and therefore there will be a lesser pressure present in the chamber 21. With the decreased pressure in the chamber 21, the diaphragm 22 will be deflected in an upward direction and will move the flapper 24 away from the nozzle 25 to drop the nozzle back pressure. This decrease in pressure will be felt on the valve 50, which will move back toward its original position, and in the feedback balancing chamber 30. In the chamber 30, the diaphragm 31 will be deflected downwardly and the rod 29 will likewise pull the diaphragm 28 in a downward direction. The resultant forces on the diaphragm 28 are transmitted to the diaphragm 27 which will tend to move the flapper 24 back to its original position.

As described thus far, the controller has been considered only in its functioning to produce an output pressure which proportionally follows an input pressure. It should be noted however that the apparatus includes both proportional band adjusting means and reset adjusting means. The reset adjustment of the controller is effected by providing means which will slowly dissipate the effect of any balancing or feedback signal. In other words, the pressure feedback force from the diaphram 31 of the chamber 30 should be dissipated in its action upon the rod 23 after a period of time so that in effect the only controlling signal for the diaphragm 27 is the set point signal. This dissipation of the feedback signal is accomplished in the present arrangement by the chambers 43 and 39 and the restriction 40. When the diaphragm 28 is deflected, there is a tendency for the fluid within the chamber 26 to flow from the chamber 26 into the capacity chambers 39 and 43. When the fluid flows through the restriction 40, there is a predetermined pressure drop across the restriction and the amount of this pressure drop will determine the effectiveness of the follow-up from the chamber 30. Thus, if the restriction 40 were completely closed off, the follow-up effect from the diaphragm 31 would be complete and the diaphragm 27 will follow continuously the deflections of the diaphragm 31. However, with the restriction 40 opened, the fluid does tend to flow into the chamber 39 and will maintain a pressure drop across the restriction 40 which is the effective pressure which is transmitted to the diaphragm 27. If the restriction 40 is completely opened, the diaphragm 27 will essentially be insensitive to the deflection of the diaphragm 31. For normal operation, however, the reset restriction 40 is set so that there is a slow reset rate for the controller. When the reset of the apparatus is effective, it slowly eliminates the effect of the feedback signal from the diaphragm 31 and if the magnitude of the variable pressure is not equal to the set point pressure, the controller will make a further adjustment of the valve 50 to attempt to bring the magnitude of the controlled variable back to the desired value.

The capacity chamber 39 in its connection to the chamber 35 tends to assume the pressure condition within the chamber 35 and therefore the chamber 39 appears as an infinite source for the set point pressure. Consequently, this source is the ultimate source for establishing the pressure in chamber 26.

As pointed out above, a fluid spring 32 is connected to the rod 29. This spring is one which has a variable gradient which is variable in accordance with the pressure condition applied to the inner surface of the spring. The signal for this spring is derived from the deviation sensing unit 52. The pressure for the spring is selected to be of a predetermined magnitude by adjusting the end adjustments 58 and 59 so as to bias the diaphragms 54 and 55 and thereby the exhaust port 60 and throttling member 66 toward each other. The forces exerted by the respective springs 56 and 57 will be balanced by a pressure condition within the chamber defined by the diaphragm 62 and 63 and this pressure will be the pressure supplied to the diaphragm or fluid spring 32. With this pressure on the fluid spring 32, the spring will exert a predetermined restriction force upon the rod 29 which will tend to vary the effect of the feedback action from the diaphragm 31 to the diaphragm 28. Thus, if a high pressure is supplied to the fluid spring 32, a larger feedback signal is required in order to overcome the gradient of the spring 32. If the pressure in the spring is less, the forces applied to the diaphragm 31 will be transmitted more readily to the diaphragm 28.

In addition to supplying a fixed pressure to the fluid spring 32, the deviation sensing unit 52 is also arranged to supply a variable pressure to the spring 32 which, in the present invention, is generally larger in magnitude whenever there is a deviation of the set point signal from the variable signal. Thus, if there is a continuous tendency for the set point signal to deviate from the variable signal, the deviation sensing unit 52 will produce a corresponding pressure signal change which is applied to the spring 32. When a long term deviation is in existence, it is desired that the sensitivity of the controller be increased and that the reset rate of the controller be increased. This is accomplished by applying an increased pressure signal to the fluid spring 32.

For example, if the set point signal from the conduit 17 is larger in magnitude than the signal derived from the variable pressure source, the diaphragm 61 will have applied on its left side the set point signal pressure and on its right side the variable pressure. The result will be a force acting upon the exhaust port 60 tending to move the exhaust port toward the right and toward the throttling member 66. On the diaphragm 67, the variable pressure will be acting on the right side thereof and the set point pressure will be acting on the left side thereof. Consequently, the throttling member 66 will be moved up against the stops 70 and 71. The exhaust port 60 will be moved toward the right against the throttling member 66 to restrict the air flowing from the chamber 53 as defined by diaphragms 62 and 63. This restricting of the exhaust port 69 will cause the pressure to build up between the diaphragms 62 and 63 until the pressure is of sufficient magnitude to balance the differential pressure force created by the set point pressure acting upon the diaphragm 61. Thus, the pressure fed from the deviation sensing unit 52 through the conduit 74 to the fluid spring 32 will follow the magnitude of the deviations between the set point signal and the variable signal.

If the variable signal should be larger than the set point signal, the opposite controlling action will take place. Thus, if the variable signal is larger, the diaphragm 61 will be deflected toward the left against the stops 64 and 65. The diaphragm 67 will be deflected toward the left and the throttling member 66 will be moved toward the exhausting port 69. Again the throttling action taking place by the throttling member 66 moving adjacent the exhaust port will cause the pressure to build up between the diaphragms 62 and 68 until there is a balancing pressure on diaphragm 68 which will balance the deviation between the set point and variable pressures.

Fig. 2 shows a plot of the various pressure signals in the deviation sensing unit 52. The set point signal is labelled $P_{SP}$ and the pressure variable is labelled $P_{VAR}$. The numeral 80 indicates the normal pressure developed by the deviation sensing unit 52 as it is applied to the fluid spring 32. The numeral 81 identifies the pressure signal developed by the deviation sensing unit when there is a deviation between the set point signal and the variable signal. It will be noted from the curves of Fig. 2 that the output pressure applied to the fluid spring always increases regardless of whether the pressure of the variable signal is larger or smaller than the pressure of the set point signal. Thus, the deviation sensing device is in a sense a full wave deviation signal rectifier.

As pointed out above, if there is a deviation signal indicated by the sensing unit 52 it is desired that the pressure increase and this increase is shown by the curves of Fig. 2. This increase in pressure follows in amplitude the actual deviation between set point and variable. The effect of the increase of the pressure in the fluid spring 32 is to increase the gain or sensitivity of the controller and to increase the reset rate so as to speed up the rate at which the controller readjusts the valve 50 to get the fluid flow back to the desired value. As the control point is approached, the pressure to the spring 32 will go back to its basic value of gradient and the controller gain and reset rate are decreased so that the system will be stable.

An additional proportional band and reset adjustment is available in variably adjusting the gradient of spring 45 by the adjustment 46. By increasing the gradient of the spring 45, there is an accompanying increase in reset rate and a widening of the proportional band or a decrease in the gain. This adjustment can be employed to establish a desired relation between the proportional and reset actions of the controller.

From the foregoing, it will be readily apparent that there has been provided a new and improved fluid controller which is self-adjusting in nature and insures a high degree of accurate control. While a specific form of controller has been shown, it is to be understood that it has been for illustrative purposes only.

While, in accordance with the provisions of the statutes, there has been illustrated and described the best forms of the embodiment of the invention known, it will be apparent to those skilled in the art that changes may be made in the forms of the apparatus without departing from the spirit of the invention as set forth in the appended claims and that in some cases certain features of the invention may be used to advantage without a corresponding use of other features.

Having now described the invention, what is claimed as new and for which it is desired to secure Letters Patent is:

1. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, a feedback source of pressure connected to said third chamber, and a source of pressure indicative of a deviation of said set point pressure source from said variable pressure source connected to said fluid spring.

2. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, an adjustable reset restriction connected in the connection between said set point source and said second chamber, a feedback source of pressure connected to said third chamber, and a source of pressure indicative of a deviation of said set point pressure source from said variable pressure source connected to said fluid spring.

3. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, a pair of mechanically coupled diaphragms defining separate chambers connected in the connection between said set point source and said second chamber, an adjustable reset fluid restriction in said last named connection, a feedback source of pressure connected to said third chamber, and a source of pressure indicative of a deviation of said set point pressure source from said variable pressure source connected to said fluid spring.

4. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, a controller reset section connected in the connection of said set point source to said second chamber, said controller reset section comprising a fluid capacity and an adjustable restriction, a feedback source of pressure connected to said third chamber, and a source of pressure indicative of a deviation of said set point pressure source from said variable pressure source connected to said fluid spring.

5. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, a feedback source of pressure connected to said third chamber, and a source of pressure indicative of a deviation of said set point pressure source from said variable pressure source connected to said fluid spring, said deviation indicative source comprising means for producing a signal pressure which varies in a single direction whether said deviation of said variable pressure source is above or below said set point pressure source.

6. A fluid controller comprising, a first chamber having a first pressure deflectable element therein, a flapper-nozzle actuator carried by said pressure deflectable element in said first chamber, a second chamber having second and third pressure deflectable elements therein, means connecting said second pressure deflectable element to said flapper-nozzle actuator, a third chamber having a fourth pressure deflectable element therein, mechanical means connecting said third and fourth pressure deflectable elements, a fluid spring connected to said last named connection, a source of pressure adjustable in accordance with the magnitude of a variable connected to said first chamber, a set point source of pressure connected to said second chamber, a feedback source of pressure connected to said third chamber, and a source of pressure indicative of a deviation of said set point pressure source from said variable pressure source connected to said fluid spring, said deviation indicative source comprising a chamber having a first pair of diaphragms carrying an exhausting port for said chamber, said diaphragms defining two enclosures, one of which has said set point pressure source applied thereto and the other of which has said variable pressure source connected thereto, a second pair of diaphragms carrying an exhaust port throttling means and defining two additional enclosures in said chamber, one of which has said set point pressure source connected thereto and the other of which has said variable pressure source connected thereto, and a restricted fluid pressure inlet to said chamber in a space between both of said pairs of diaphragms.

7. A fluid type controller comprising, a first chamber having a variable pressure applied thereto, a pressure deflectable element defining a wall of said chamber, a flapper-nozzle unit connected to be actuated by said pressure deflectable element and producing an output control pressure proportional to the variable pressure, a second balancing chamber having a feedback pressure derived from said flapper-nozzle unit applied thereto, said second balancing chamber producing a feedback force on said flapper-nozzle unit, and a variable gradient fluid spring connected to vary the effect of said second balancing chamber on said flapper-nozzle unit.

8. A fluid type controller comprising, a first chamber having a variable pressure applied thereto, a pressure deflectable element defining a wall of said chamber, a flapper-nozzle unit connected to be actuated by said pressure deflectable element and producing an output control pressure proportional to the variable pressure, a second balancing chamber having a feed back pressure derived from said flapper-nozzle unit applied thereto, said second balancing chamber producing a feedback force on said flapper-nozzle unit, and a variable gradient fluid spring connected to vary the effect of said second balancing chamber on said flapper-nozzle unit, said fluid spring having connected thereto a variable source of pressure indicative of a predetermined deviation of a variable to be controlled by said controller.

9. A fluid type controller comprising, a flapper-nozzle unit for producing a fluid pressure, a first pressure force producing device connected to said flapper-nozzle unit to vary the fluid output pressure thereof, a second pressure force producing device connected to said flapper-nozzle unit to exert a balancing force thereon, means connecting said second pressure force producing device to respond to a pressure signal derived from said flapper-nozzle unit, and an adjustable gradient fluid spring connected to said second pressure force producing device to vary the controlling effect of said controller.

10. Apparatus as defined in claim 9 wherein said adjustable gradient fluid spring has connected thereto a variable fluid pressure source whose pressure variations are indicative of the deviation of a variable which produces a pressure for said first pressure force producing device.

11. Apparatus as defined in claim 9 wherein a third pressure force producing device is interposed between said first pressure force producing device and said second pressure force producing device, and a set point signal pressure source is connected to said third pressure force producing device.

12. A self-adjusting controller comprising, a variable gradient fluid spring, and means supplying a variable fluid pressure thereto comprising a chamber having a first pair of diaphragms carrying an exhausting port for said chamber, said diaphragms defining two enclosures, one of which has said set point pressure source connected thereto and the other of which has said variable pressure source connected thereto, a second pair of diaphragms carrying an exhaust port throttling means and defining two additional enclosures in said chamber, one of which has said set point pressure source connected thereto and the other of which has said variable pressure source connected thereto, and a restricted fluid pressure inlet to said chamber between said two pair of diaphragms.

13. A fluid type controller comprising, a first chamber having a first deflectable element enclosing a portion thereof, a variable pressure signal source connected to said chamber, a flapper-nozzle unit connected to said first deflectable element to produce a control pressure signal, a second chamber having second and third deflectable elements enclosing the same, means connecting said second element in controlling relation to said flapper-nozzle unit, means connecting said second chamber to a set point source, said means comprising a capacity chamber and a restriction, a third chamber including a fourth deflectable element enclosing a portion thereof, means connecting said third chamber to the output of said flapper-nozzle unit, a feedback connection between said fourth element and said third element, and a resilient force producing means acting on said last named connection.

14. Apparatus as defined in claim 13 wherein said means connecting said second chamber to a set point source includes a capacity chamber having a resiliently loaded flexible wall.

15. Apparatus as defined in claim 14 wherein the flexible wall of said capacity chamber is resiliently loaded by means having a resilient gradient adjustment therefor.

16. A fluid controller comprising, a chamber having a first pair of diaphragms defining two enclosures therein, a second pair of diaphragms defining two additional enclosures therein, a fifth enclosure between said named enclosures, a restricted fluid supply line for said fifth enclosure, means including an exhausting port for said fifth enclosure carried by said first pair of diaphragms, an exhaust port throttling means carried by said second pair of diaphragms, and input pressure signal connections to each of said first four named enclosures.

References Cited in the file of this patent
UNITED STATES PATENTS

| | | |
|---|---|---|
| 2,409,871 | Krogh | Oct. 22, 1946 |
| 2,518,244 | Moore | Aug. 8, 1950 |
| 2,638,911 | Griswold | May 19, 1953 |